United States Patent [19]
DiLeo

[11] Patent Number: 5,377,446
[45] Date of Patent: Jan. 3, 1995

[54] FLYING INSECT SWATTER

[76] Inventor: Richard DiLeo, 2124 Kittredge St. #8, Berkeley, Calif. 94704

[21] Appl. No.: 98,130

[22] Filed: Jul. 26, 1993

[51] Int. Cl.⁶ .............................................. A01M 3/02
[52] U.S. Cl. ...................................................... 43/137
[58] Field of Search ...................... 43/137; 30/114, 302, 30/303

[56] References Cited

U.S. PATENT DOCUMENTS

| | | | |
|---|---|---|---|
| D. 91,616 | 2/1934 | Drake | 43/137 |
| 1,112,991 | 10/1914 | Dufner | 30/303 |
| 1,882,291 | 10/1932 | Monroe | 43/137 |
| 1,939,838 | 12/1933 | Wasson | 43/137 |
| 2,934,851 | 5/1960 | Grish | 43/137 |

*Primary Examiner*—Kurt Rowan
*Attorney, Agent, or Firm*—Flehr, Hohbach, Test, Albritton & Herbert

[57] ABSTRACT

A flying insect swatter which includes a plurality of cutting elements arranged in a grid-like array. Adjacent cutting elements are spaced apart by a distance less than the wingspan of a flying insect but far enough to permit air to pass freely between the elements without creating an appreciable pressure wave ahead of the cutting head. The cutting elements are adapted to cut insects into pieces which pass between the cutting elements when the head is swung through the air. In the disclosed embodiment, the handle and the head are formed as a unitary structure of flexible plastic material, and the cutting elements have a diamond shaped profile in cross-section.

7 Claims, 1 Drawing Sheet

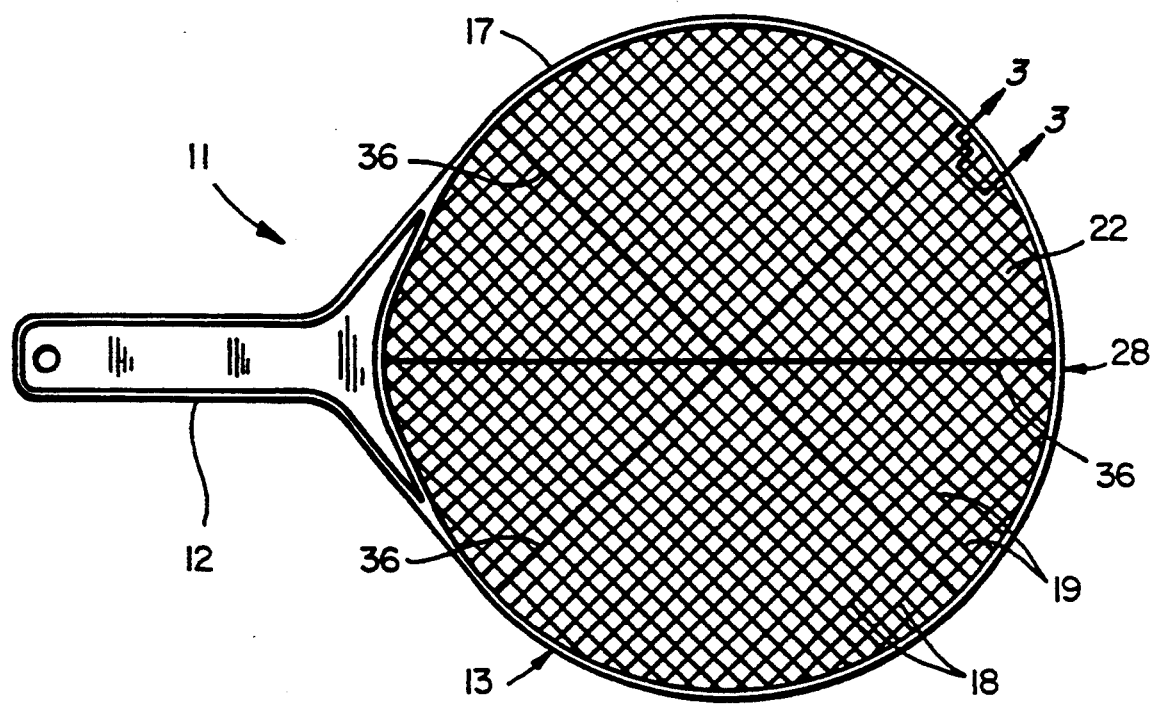
FIG_1
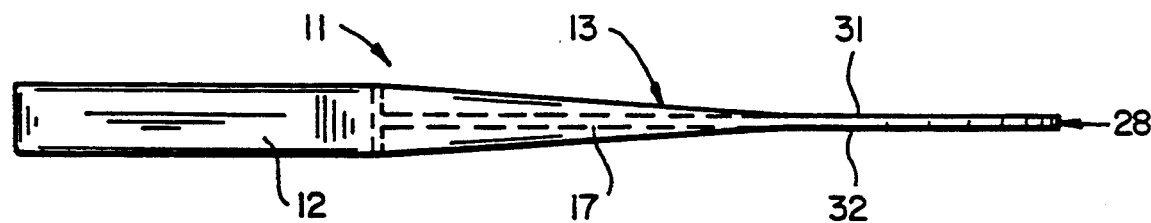
FIG_2
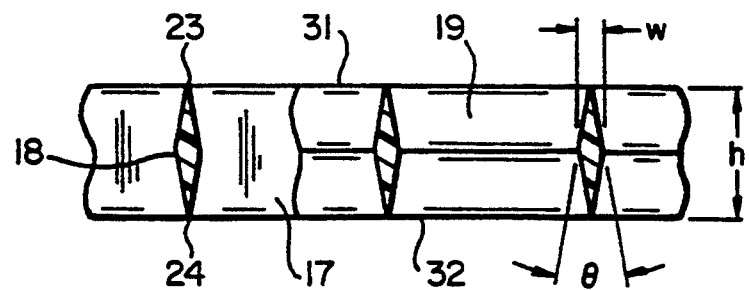
FIG_3

FLYING INSECT SWATTER

This invention pertains generally to insect swatters and, more particularly, to insect swatters which are particularly suitable for killing insects in flight.

Insect swatters with mesh heads have been provided for stunning or killing insects, generally by crushing them. Such swatters have a number of limitations and disadvantages. Most of them are designed for striking insects which are at rest on a surface, but insects spend little time resting on surfaces, and it is often difficult or undesirable to strike insects on certain surfaces. Such swatters typically have relatively small heads of fine mesh with relatively small openings which restrict the flow of air through the mesh. Such heads exhibit a substantial resistance to movement through the air, and this limits the size of the heads which can be constructed in this manner.

When swung through the air, a swatter with a fine mesh creates a wave of increased air pressure ahead of the head which many insects are able to detect and then take evasive action to avoid being hit. Even if the insects do not try to get away, the pressure wave itself can sweep them out of the path of the head and prevent them from being hit.

It is in general an object of the invention to provide a new and improved insect swatter.

Another object of the invention is to provide an insect swatter of the above character which overcomes the limitations and disadvantages of insect swatters heretofore provided.

Another object of the invention is to provide an insect swatter of the above character which is particularly suitable for killing insects in flight.

These and other objects are achieved in accordance with the invention by providing an insect swatter which has a plurality of cutting elements arranged in a grid-like array. Adjacent ones of the cutting elements are spaced apart by a distance less than the wingspan of a flying insect but far enough to permit air to pass freely between the elements without creating an appreciable pressure wave ahead of the cutting head. The cutting elements are adapted to cut insects into pieces which pass between the cutting elements when the head is swung through the air.

FIG. 1 is a top plan view of a flying insect swatter according to the invention.

FIG. 2 is a side elevational view of the embodiment of FIG. 1.

FIG. 3 is an enlarged cross-sectional view taken along line 3—3 in FIG. 1.

As illustrated in the drawings, insect swatter 11 has a longitudinally extending handle 12 and a striking portion or cutting head 13 connected to the handle. Head 13 is generally circular in plan view and includes a peripheral rim 17 and a plurality of cutting elements or blades arranged in groups 18 and 19. The elements in each group are parallel to each other, with elements 18 extending at right angles to elements 19 to form a grid-like array. Cutting elements 18 and 19 are disposed at an angle of approximately 45° to the longitudinal centerline of the swatter and intersect to form a honeycombed pattern of openings or holes 22 in head 13.

Adjacent ones of the cutting elements 18 and adjacent ones of the cutting elements 19 are spaced apart from each other by a distance less than the wingspan of the insects to be killed and large enough to permit air to pass freely between the elements without creating a pressure wave ahead of the head. For insects such as houseflies, mosquitos, moths, wasps and the like, a spacing on the order of 3/16 to ⅜ inch is preferred, with ¼ inch being particularly preferred.

In the embodiment illustrated, each cutting element 18 and 19 has a diamond shaped profile with cutting edges 23, 24 on opposite sides thereof. These elements have a height h on the order of 3/16 inch and a width w on the order of 0.030 inch, and each of the cutting edges has an included angle on the order of 18 degrees. While this particular configuration is presently preferred, it will be understood that the cutting elements can be of any suitable size and configuration. Where a two-sided swatter is not required, for example, cutting edges can be formed on only one side of the blades. It is also possible to use cutting elements with other cross-sectional shapes, e.g. round, as long as they provide the desired cutting function. One such alternative is a wire having a diameter on the order of 0.025 inch. The swatter can be of any suitable size and might, for example, have a length of 17 inches and a head diameter of 11 inches.

The diamond shaped profile also has an advantage from an aerodynamic standpoint in that it promotes a smooth and efficient flow of air past the cutting elements as the swatter is swung through the air. Other profiles which promote such a flow can also be used, e.g. oval shaped elements with curved sides and sharp edges on the two faces of the head.

The array in which the cutting elements are arranged is generally planar, the tips of the cutting edges lying in planes 31, 32 on opposite sides thereof. Handle 12 is thicker than the cutting elements, and rim 17 tapers in thickness as it extends from the handle around the head to a point on the sides of the head about midway between the inner and outer ends of the head. The outer portion of the rim has approximately the same thickness or height as the cutting elements, and the outer end portion 28 of the head has a substantially flat profile which is suitable for swatting insects on flat surfaces and the like.

Swatter 11 can be fabricated from any suitable material or materials, and in one presently preferred embodiment, the swatter is formed as a unitary structure of flexible plastic by injection molding. In the embodiment illustrated, head 13 is provided with diagonally extending ribs 36 which add some rigidity to the head and also serve as runners which facilitate the distribution of plastic material throughout the head during the molding process.

In operation and use, the swatter is grasped by the handle and swung through the air at flying insects such as houseflies, mosquitoes, moths or wasps. Opposite cutting edges 23 and 24 permit either face of the head to be forward facing. Cutting elements 18 and 19 are spaced apart far enough to permit air to pass freely between the cutting elements without creating an appreciable pressure wave in front of the advancing head 13 which may sweep the insect out of the way of swatter 11 or alert the insect in sufficient time so as to permit the insect to evade the swatter.

Cutting elements 17 and 18 are adapted to cut an insect into pieces rather than crushing it. In this regard, cutting elements 17 and 18 are spaced apart by a distance less than the wingspan of the insect. Cutting edges 23 or 24 serve to cut the wings or other critical parts off the insect, thereby incapacitating it and rendering it incapable of further flight. As noted above, swatter 11 is particularly suitable for killing insects in flight. Planar end portion 28, however, also permits the swatter to be used to dismember insects which have settled on a surface. The flexible construction of the swatter minimizes damage to surfaces when the swatter is used in this manner, and the oblique orientation of cutting elements 18 and 19 to the longitudinal centerline of the swatter strengthens head 13 for this application.

It is apparent from the foregoing that a new and improved flying insect swatter has been provided. While only one presently preferred embodiment has been described in detail, as will be apparent to those familiar with the art, certain changes and modifications can be made without departing from the scope of the invention as defined by the following claims.

I claim:

1. In a flying insect swatter: a handle, a head connected to the handle for being swung through the air to swat insects in flight, said head having a plurality of cutting elements having a width on the order of 0.025 to 0.030 inch arranged in a grid-like array in which adjacent ones of the cutting elements are spaced apart by a distance on the order of 3/16 to ⅜ inch, with each of the cutting elements having a cutting edge with an included angle of no more than about 18 degrees for cutting insects swatted in flight into pieces which pass between the elements as the head moves through the air.

2. The flying insect swatter of claim 1 wherein the handle and the head are formed as a unitary structure of flexible plastic material.

3. The flying insect swatter of claim 1 wherein the cutting elements have a diamond shaped profile in cross-section with cutting edges on opposite sides thereof.

4. A swatter for striking insects in flight, comprising a head of relatively large lateral dimension, a handle of shorter length than the head extending from one side of the head for swinging the head through the air to strike insects in flight, said head having a plurality of cutting elements arranged in a generally planar grid-like array in which adjacent ones of the cutting elements are spaced apart by a distance less than the wingspan of a flying insect but large enough to permit air to pass freely between the elements without creating an appreciable pressure wave ahead of the head as the head moves through the air, said cutting elements each having two surfaces which come together at an included angle no greater than about 18 degrees to form a cutting edge for cutting the insect into pieces which pass between the cutting elements when the head is swung through the air.

5. The swatter of claim 4 wherein the cutting elements have a spacing-to-width ratio d/w of at least 5.25:1, where d is the spacing between adjacent ones of the elements, and w is the width of the elements.

6. The swatter of claim 5 wherein each of the cutting elements has a diamond shaped profile with a height-to-width ratio h/w on the order of 6.25, where h is the height of the element in a direction perpendicular to the plane of the array, and w is the width of the element in the plane of the array.

7. In a flying insect swatter: a handle, a head connected to the handle having a plurality of cutting elements having a width no greater than about 0.030 arranged in a grid-like array in which adjacent ones of the cutting elements are spaced apart by a distance on the order of at least ¼ inch, said cutting elements having a diamond shaped profile in cross-section with cutting edges having included angles no greater than about 18 degrees on opposite sides thereof.

* * * * *